Patented Mar. 15, 1927.

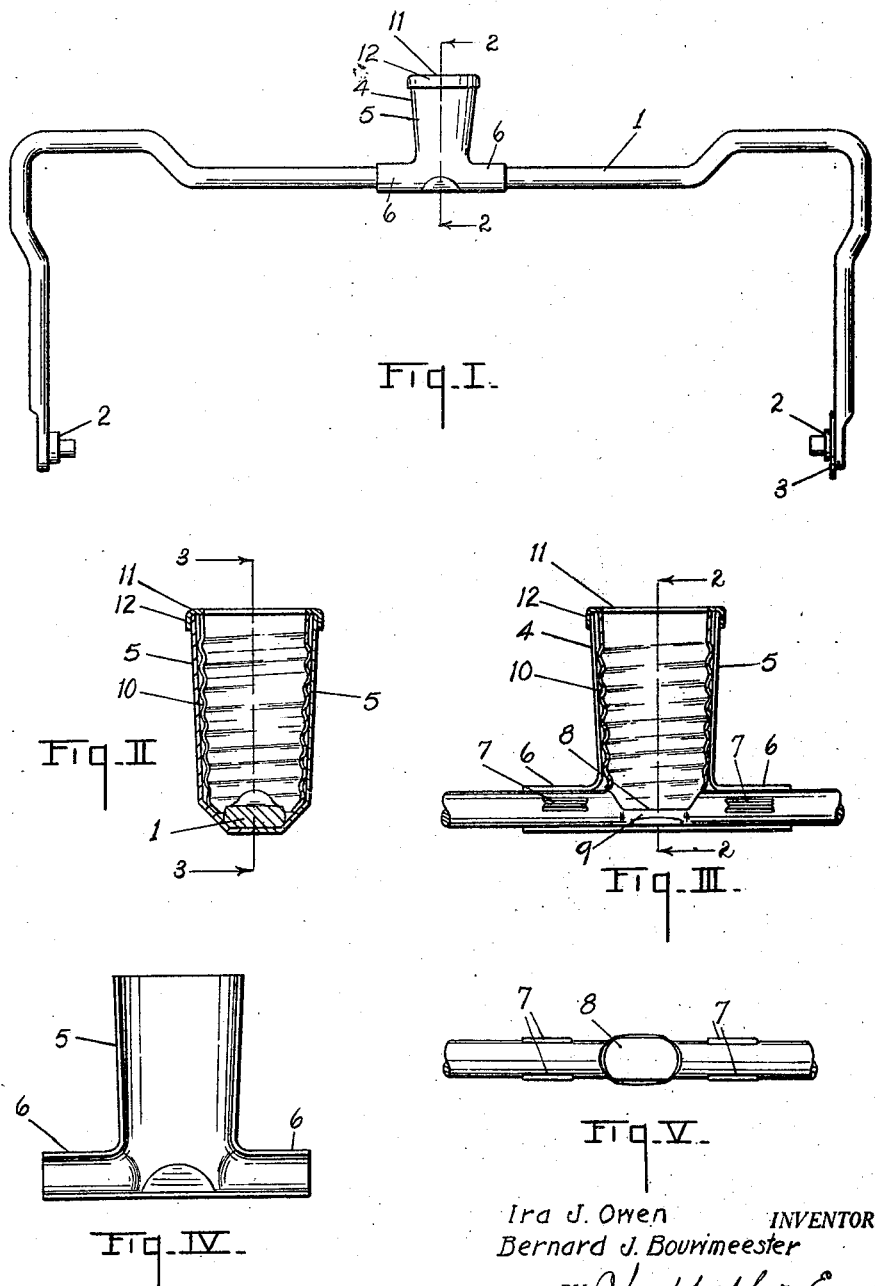

1,621,080

UNITED STATES PATENT OFFICE.

IRA J. OWEN AND BERNARD J. BOUWMEESTER, OF GRAND RAPIDS, MICHIGAN, ASSIGNORS, BY MESNE ASSIGNMENTS, TO BISSELL CARPET SWEEPER COMPANY, OF GRAND RAPIDS, MICHIGAN, A CORPORATION OF MICHIGAN.

HANDLE SOCKET FOR CARPET SWEEPERS.

Application filed November 8, 1923. Serial No. 673,488.

This invention relates to improved handle socket for carpet sweepers.

The object of the invention is to provide a simple and effective screw socket which is economical to manufacture and readily located on a rod bail by spot welding method. A specific object is to improve, expedite and strengthen the structure of our former Patent No. 1,309,775.

Objects relating to details of construction and operation will appear from the detailed description to follow.

We accomplish the objects of the invention by the devices and means described in the following specification. The invention is defined in the claim. A structure embodying a preferred construction is illustrated in the accompanying drawing, forming a part of this application, in which:

Fig. I is a detail elevation view of a carpet sweeper bail and handle socket embodying the features of our invention.

Fig. II is an enlarged detail transverse sectional view on line 2—2 of Figs. I and III, through the socket member in position on the bail.

Fig. III is a detail longitudinal sectional view taken on line 3—3 of Fig. II, through the socket, the bail being shown in full lines.

Fig. IV is a detail elevation view of one of the symmetrical half stampings of the outer shell of the socket member.

Fig. V is a detail plan view of the central portion of the handle bail rod before the socket has been applied.

In the drawings the sectional views are taken looking in the direction of the little arrows at the ends of the section lines, and similar numerals of reference refer to similar parts throughout the several views.

The parts of the drawing will be referred to by their numbers. 1 is the bail formed of rod, 2, 2 are the bail pivots at the ends, and 3 is the flange or disk for the yielding connection to the said bail, all of which parts are of usual construction and consequently are not detailed here. The socket 4 is made up of a pair of symmetrical shell members 5, on the lower portion of which are formed half tubular welding lugs 6, 6, forming a hollow cross arm support for attachment to the center of the bail rod 1, the same being closely conformed to said bail rod. At each side of the center the bail rod 1 is roughened at 7 by suitable serrations to facilitate the spot welding thereof to the tubular lugs 6. A swaged depression 8 is formed in the top of the bail 1, and it is suitably projected and flattened at 9 on the sides to form close contact for spot welding the shell members to the center of the bail 1. The depression 8 is to receive and engage the lower end of the screw threaded socket lining 10, which is disposed within the outer socket shell 4. A retaining ring 11 is at the top of the socket and flanged at 12 around the upper end of the socket shell 4 to retain the halves thereof in position and also to clamp the screw threaded socket lining 10 in place.

The screw threaded socket lining is formed of sheet metal which is very readily produced in this form by stamping. This structure enables all parts of the socket to be made of stampings and very quickly and effectively assembled by die press methods and spot welding, producing a finished socket with a minimum amount of material and labor. The end of the handle may or may not be provided with a corresponding ferrule, as is common practice at the present time.

Having thus described our invention, what we claim as new and desire to secure by Letters Patent is:

In a carpet sweeper handle socket the combination of a socket member made up of an outer shell formed of symmetrical halves of sheet metal, with tubular cross extension lugs at each side, a screw threaded sheet metal socket lining between the said symmetrical halves, a retaining collar around the ends of said socket casing flanged to clamp the same together and retain the lining in position, and a rod bail member with central swaged depression conformed to receive said socket lining and fit the bottom of said shell and disposed and spot welded to the tubular cross extension of said shell.

In witness whereof, we have hereunto set our hands.

IRA J. OWEN.
BERNARD J. BOUWMEESTER.